(12) United States Patent
Bennett et al.

(10) Patent No.: US 12,725,481 B2
(45) Date of Patent: Sep. 1, 2026

(54) PERSONALIZED AND THEMED TRANSACTION INTERFACE

(71) Applicant: NCR Voyix Corporation, Atlanta, GA (US)

(72) Inventors: Gina Torcivia Bennett, Lawrenceville, GA (US); Kip Oliver Morgan, Atlanta, GA (US); WuChieh James Jong, Raleigh, NC (US); Jay Arcement, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/963,026

(22) Filed: Nov. 27, 2024

(65) Prior Publication Data

US 2026/0148604 A1 May 28, 2026

(51) Int. Cl.
*G07F 9/02* (2006.01)
*G06F 9/451* (2018.01)

(52) U.S. Cl.
CPC .............. *G07F 9/023* (2013.01); *G06F 9/451* (2018.02)

(58) Field of Classification Search
CPC ................................ G07F 9/023; G06F 9/451
See application file for complete search history.

(56) References Cited

U.S. PATENT DOCUMENTS 7,845,554 B2 * 12/2010 Jacobs .................. G06Q 20/20 235/383
2015/0019373 A1 * 1/2015 Carbonell .......... G06Q 30/0631 705/26.7
2018/0276636 A1 * 9/2018 Kobayashi ....... G06Q 20/40145

FOREIGN PATENT DOCUMENTS

JP 2025026014 * 8/2023

* cited by examiner

*Primary Examiner* — Florian M Zeender
*Assistant Examiner* — Kimberly S. Bursum
(74) *Attorney, Agent, or Firm* — Schwegman Lundberg & Woessner, P.A.

(57) ABSTRACT

Methods and a system for personalizing self-checkout terminals based on customer loyalty information includes receiving customer preferences during registration, generating themed personas with specific color schemes, graphics, and animations relevant to the customer's registered interests, and dynamically applying personalized interface themes when customers are identified at self-checkout terminals. The system maintains cached personas tagged with attributes like interests, religious preferences, and dietary restrictions, enabling sub-second personalization by matching customer preferences to pre-generated themes. The system avoids showing inappropriate content by filtering themes based on offensive content, collects user feedback on displayed themes through a rating mechanism, and employs time-delay factors to prevent theme repetition. New personas and corresponding themes are periodically generated to maintain customer engagement while keeping processing costs manageable.

18 Claims, 3 Drawing Sheets

PERSONALIZED AND THEMED TRANSACTION INTERFACE

BACKGROUND

Current self-checkout systems in retail environments face several key challenges that impact customer experience and loyalty. These systems often lack personalization capabilities, with loyalty systems containing minimal information about customer preferences, dietary needs, or other personal considerations. The impersonal nature of these systems fails to promote customer loyalty effectively, and traditional attempts at personalized branding typically require excessive processing time that is incompatible with real-time retail transactions. Additionally, existing systems lack effective mechanisms for gathering and incorporating customer feedback on personalization efforts, even as younger generations increasingly expect personalized retail experiences. These limitations can drive customers away from self-checkout options and result in missed opportunities for building customer relationships and increasing repeat visits.

DETAILED DESCRIPTION

Figure 1:
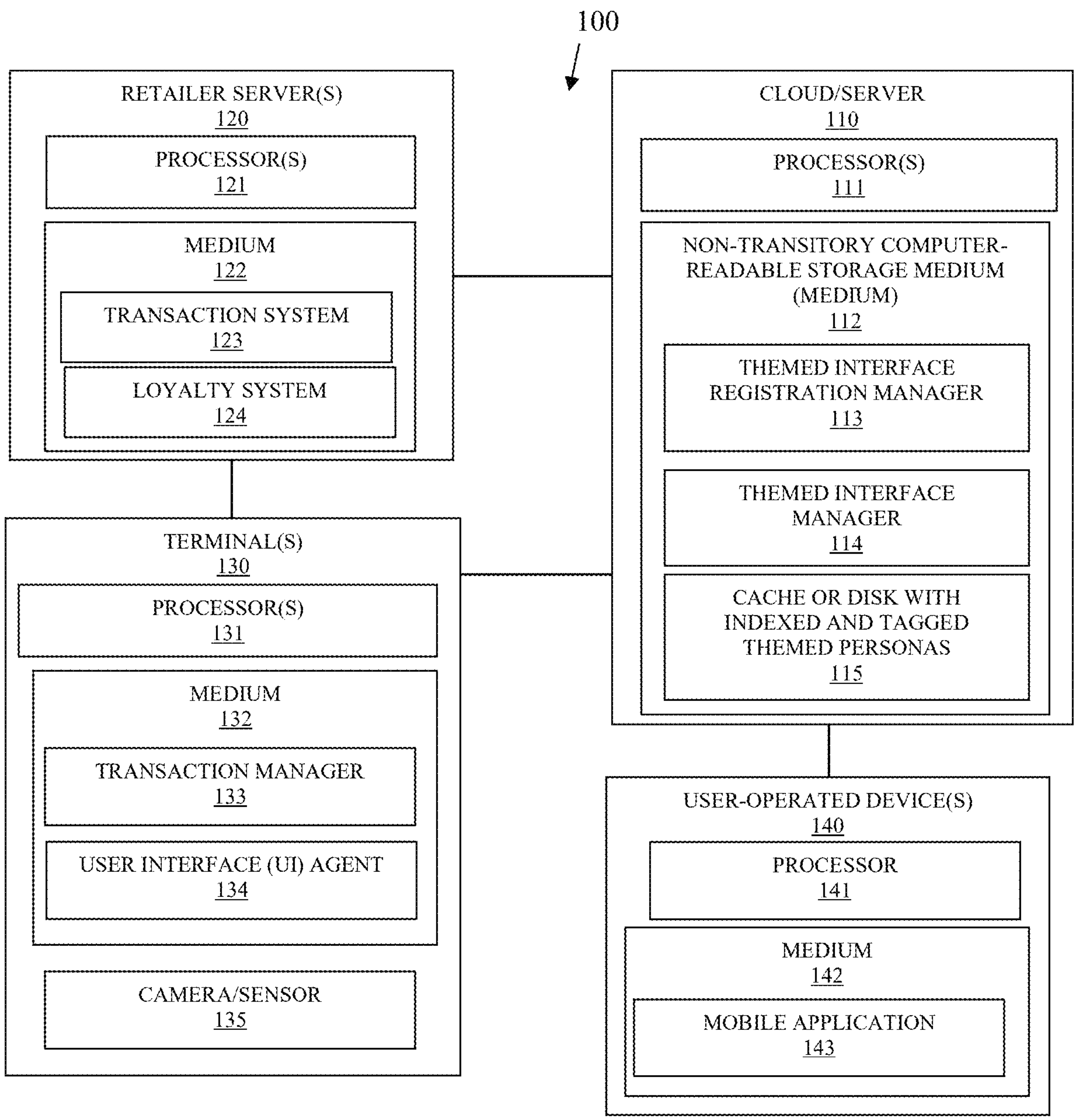
FIG. 1 is a diagram of a system for providing personalized themed transaction interfaces during self-checkouts, according to an example embodiment.

As stated above, current self-checkout systems face significant challenges in delivering personalized experiences that meet modern customer expectations. Loyalty systems typically contain minimal information about customer personalities, dietary requirements, and affiliation preferences, resulting in impersonal interactions that fail to foster customer loyalty effectively.

Generation Z customers increasingly expect personalized experiences at retail stores, yet traditional personalization approaches often require excessive processing time, making them impractical for real-time retail environments. Additionally, existing systems lack mechanisms for customers to provide feedback on personalization effectiveness, leaving retailers unable to gauge customer satisfaction with their branding efforts.

The impersonal nature of current self-checkout systems can drive customers away and result in missed opportunities for building lasting customer relationships. This is particularly problematic as media-based fear mongering about self-checkout systems may further discourage customer adoption. Moreover, implementing personalization features has traditionally been resource-intensive and expensive, making it challenging for retailers to justify the investment.

In an embodiment presented herein, these challenges are addressed through methods and a system that enables customers to input detailed preferences during registration, including language preferences, religious considerations, dietary restrictions, and personal interests via user-operated devices (e.g., phones, laptops, desktops, tablets, etc.) or websites (e.g., via web browsers of user-operated devices). The system maintains cached personas tagged with specific attributes, allowing for near-instantaneous personalization when customers are identified at self-checkout terminals. In an embodiment, the system employs an innovative caching mechanism that enables ultra-fast personalization by storing only essential elements-four background graphics, a logo, and color codes making it possible to maintain an extensive library of themes in a cloud bucket. When a customer's loyalty information is recognized, the system rapidly matches their preferences to pre-generated themes, creating a personalized experience within seconds.

An embodiment presented herein includes sophisticated safeguards to ensure appropriate content delivery, filtering themes based on offensive content. Furthermore, a feedback mechanism allows customers to rate their experience; for example, through a simple thumbs up/thumbs down at a conclusion of a self-checkout at a self-checkout terminal, enabling continuous improvement of personalization efforts. To maintain engagement while managing processing costs effectively, new themes can be generated periodically, such as weekly to align with store promotions, sporting events, holidays, and/or cultural events.

The embodiments provide significant value by enhancing customer retention through personalized experiences that are particularly appealing to younger generations. The system's ability to respect religious beliefs, political views, and dietary preferences demonstrates sensitivity to customer values while improving the overall shopping experience. The system efficiently addresses resource constraints through innovative caching mechanisms, making personalization both practical and cost-effective for retailers.

As used herein a "user" and a "customer" may be used interchangeably and synonymously. This is an individual who registers for a personalized themed user interface (UI) during self-checkouts at self-checkout terminals.

As used herein "terminal" and "self-checkout terminal" may be used interchangeably and synonymously. A customer performs a self-checkout via a self-checkout terminal or terminal.

A "persona" is a collection of UI elements and associated metadata that represents a customer's preferences and is used to generate themed interfaces. A "theme" is the visual presentation derived from a persona that is displayed as background or within SCO animations during a customer's self-checkout at a SCO terminal.

A "themed persona" is a cached data structure or a data structure stored on one or more local disks that includes definitions for background objects, colors, images, visual look and feel of SCO animations, and/or graphics. In an embodiment, a themed persona includes four background objects, which may be graphics, images, visual designs, and/or visual look and feel of SCO animations. Each background object associated with a different state of a transaction workflow during a self-checkout at a SCO terminal. For example, a first state is associated with the welcome screen to start a self-service transaction, a second state is associated with item scanning and item detail screens during the transaction, a third state is associated with item searching or item lookup screens during the transaction, and a fourth state is associated with a thank you screen upon payment and conclusion of the transaction. In an embodiment, the data structure further includes a logo or trademark, a set of hex codes defining customer preferred colors, and tags for attributes such a customer interests, customer religious preferences, customer preferred types of foods, and customer preferred holiday indications.

A "themed interface" is the customized display of transaction interface screens within a transaction interface of a SCO terminal that incorporates visual elements (e.g., background graphics, colors, animations, logos, trademarks, and visual designs) specified by an employed theme during a customer's self-checkout at the SCO terminal. A "personalized interface theme" is a theme that has been specifically matched to a customer's registered preferences (e.g., including color preferences, interests, religious preferences, dietary restrictions or types of food, etc.) and is presented within transaction interface screens of a transaction interface during the customer's self-checkout at the SCO terminal.

FIG. 1 is a diagram of a system 100 for providing personalized themed transaction interfaces during self-checkouts, according to an example embodiment. Notably, the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing personalized themed UIs during self-checkouts at self-checkout (SCO) terminals, presented herein and below.

System 100 includes a cloud 110 or server, one or more retailer servers 120, one or more terminals 130, and one or more user-operated devices 140. Cloud 110 includes at least one processor 111 and a non-transitory computer-readable storage medium 112 (medium), which includes instructions for a themed interface registration manager 113 and a themed interface manager 114. The instructions when executed by the processor 111 cause the processor 111 to perform operations discussed herein and below with respect to themed interface registration manager 113 and themed interface manager 114. Medium 112 also includes a cache or disk with indexed and tagged themed personas 115.

Each retail server 120 includes at least one processor 121 and a medium 122, which includes instructions for a transaction system 123 and a loyalty system 124. The instructions when executed by the processor 121 cause the processor 121 to perform the operations discussed herein and below with respect to transaction system 123 and loyalty system 124.

Each terminal 130 includes at least one processor 131 and a medium 132, which includes instructions for a transaction manager 133 and a UI agent 134. The instructions when executed by the processor 131 cause the processor 131 to perform the operations discussed herein and below with respect to transaction manager 133 and UI agent 134. Each terminal 130 may also include one or more cameras and/or sensors 135, which include an image sensor, a light detection and ranging (Lidar) sensor and/or infrared (IR) sensor.

Each user-operated device 140 includes at least one processor 141 and a medium 142, which includes instructions for a mobile application 143. The instructions when executed by the processor 141 cause the processor 141 to perform operations discussed herein and below with respect to mobile application 143.

In an embodiment, cameras and/or sensors 135 can be used to identify registered customers through facial recognition when they approach the terminal 130 for a self-checkout. This provides an automated mechanism by which a customer can be linked to a loyalty account without any manual entry of information provided by the customer at the terminal 130. In an embodiment, sensors 135 include palm reading capabilities that provide an additional biometric technique for identifying registered customers and linking them to their loyalty accounts when they approach terminal 130 for a self-checkout.

Initially, a customer registers for personalized themed interfaces through mobile application 143 executing on their user-operated device 140. The mobile application 143 presents a registration UI that allows the customer to input detailed preferences including language preferences, religious preferences (e.g., Christianity, Judaism, Islam, Hinduism, other, or none), dietary preferences (e.g., vegan, vegetarian, pescetarian, gluten free/celiac, nut allergy, or none), and interests (e.g., sports, specific sport teams, pop-culture, music, movies/entertainment, history, or other). In an embodiment, mobile application 143 is a set of browser pages accessed via a web browser of the user-operated device 140.

The mobile application 143 communicates the customer's input preferences to themed interface registration manager 113. During registration, themed interface registration manager 113 obtains loyalty identifying information from the customer, such as a phone number, email address, a facial image of the customer, or loyalty card number, and interacts with loyalty system 124 to link the customer's preferences to their loyalty account. The themed interface registration manager 113 stores the customer's selected preferences and interests in a loyalty record associated with the customer's loyalty account within loyalty system 124 and sets a flag in the loyalty record indicating the customer is registered for personalized themed interfaces during self-checkouts at terminals 130.

In an embodiment, a customer may register through a terminal 130 during a checkout transaction. The UI agent 134 presents the registration interface on the terminal's display, allowing the customer to input their preferences and loyalty identifying information. The UI agent 134 communicates with themed interface registration manager 113, which processes the registration similarly to the mobile application scenario by interacting with loyalty system 124 to create or update the customer's loyalty record.

In an embodiment, highly valued customers can have their own dedicated personas stored in cache or local disks 115. High valued customers are identified based on their loyalty level from their loyalty account and/or transaction histories linked to their loyalty accounts.

In an embodiment, the themed registration manager 113 includes review or filter logic that allows automated or manual review and removal of any generated personas that are deemed to be offensive. This can be performed during an audit of themes derived from the personas or based on customer feedback provided from customers.

In an embodiment, the themed registration manager 113 utilizes a specialized input sentence, which includes the preferences and interests of the customers, provided to an artificial intelligence (AI) algorithm for purposes of initially generating the colors, graphics, logos, etc. for the personas. The specialized input sentence is referred to as an AI prompt. In an embodiment, the AI prompt is customized to exclude results that would be considered offensive based on a given customer's religious or dietary preferences. In an embodiment, themed interface registration manager 113 generates new personas weekly to align with store promotions, sporting events, and cultural events. This periodic generation helps maintain fresh content while managing processing costs.

Upon receiving the customer's preferences, themed interface registration manager 113 generates a themed persona specific to the customer. In an embodiment, the themed persona includes four background objects (graphics, images, or animations), a logo or trademark, and a set of hex codes defining the customer's preferred colors. The themed interface registration manager 113 tags the generated persona with relevant attributes based on the customer's registered preferences, such as interests, religious preferences, types of food, and any holidays that the theme may align to. The tagged themed persona is then indexed and stored in cache or local disks 115 for rapid access during future customer transactions.

When a registered customer initiates a transaction at a terminal 130, the transaction manager 133 obtains a loyalty identifier for the customer and provides it to UI agent 134. The UI agent 134 communicates the loyalty identifier to themed interface manager 114 to request a personalized theme for the customer's self-checkout or transaction.

Upon receiving the loyalty identifier, themed interface manager 114 locates the customer's loyalty account through loyalty system 124 and verifies the personalized theme registration flag is set in the loyalty record. The themed interface manager 114 retrieves the customer's registered preferences and interests from the loyalty record and performs a search of the cached personas in cache or local disks 115. The search identifies a best matching persona based on multiple factors including the customer's registered color preferences, registered interests, current calendar date, current location associated with the terminal 130, and any persona identifiers flagged as being disliked in the customer's loyalty record.

Once a best matching persona is identified, themed interface manager 114 translates the corresponding themed persona into a set of UI instructions that specify the background graphics, colors, animations, logos or trademarks, and visual designs to be presented during the transaction. These UI instructions are provided to UI agent 134, which uses an application programming interface (API) to interact with transaction manager 133 to apply the personalized theme interface within the transaction screens of the transaction interface during the customer's self-checkout.

At the conclusion of the transaction, UI agent 134 presents a feedback interface allowing the customer to rate the presented theme. In an embodiment, the feedback interface includes a visual depiction of a thumbs up or thumbs down for the theme used during the self-checkout. The customer selects either the thumbs up or thumbs down visual depiction within the feedback interface. If the customer provides a thumbs down rating indicating dislike of the theme, themed interface manager 114 updates the customer's loyalty account to flag the persona identifier of the disliked theme with a loyalty record of the customer's loyalty account. This flagged persona identifier is then used by themed interface manager 114 to exclude the corresponding themed persona from consideration in subsequent self-checkouts for that customer. When the customer provides a thumbs up rating for a theme, theme interface manager 114 updates the customer's loyalty account to weight a corresponding persona more heavily for future persona selections for that customer.

In an embodiment, themed interface manager 114 automatically changes a natural written language of text and audio prompts associated with a theme based on registered language preferences of the customer. That is a selected persona for a given customer that includes text or audio prompts are changed to the customer's preferred language before the instructions for the corresponding themed interface is sent to the UI agent 134.

In an embodiment, themed interface manager 114 employs a time-of-day factor to prevent showing a same customer a same previously presented theme when the customer performs more than one transaction in any given day, regardless of which terminal 130 is used for the subsequent transaction. This time-delay mechanism, combined with the periodic generation of new personas at predefined intervals, helps ensure customers receive fresh, engaging experiences across multiple visits while avoiding theme repetition. Furthermore, customer feedback on presented themes ensures that a customer does not see a disliked theme a second time.

Figure 2:
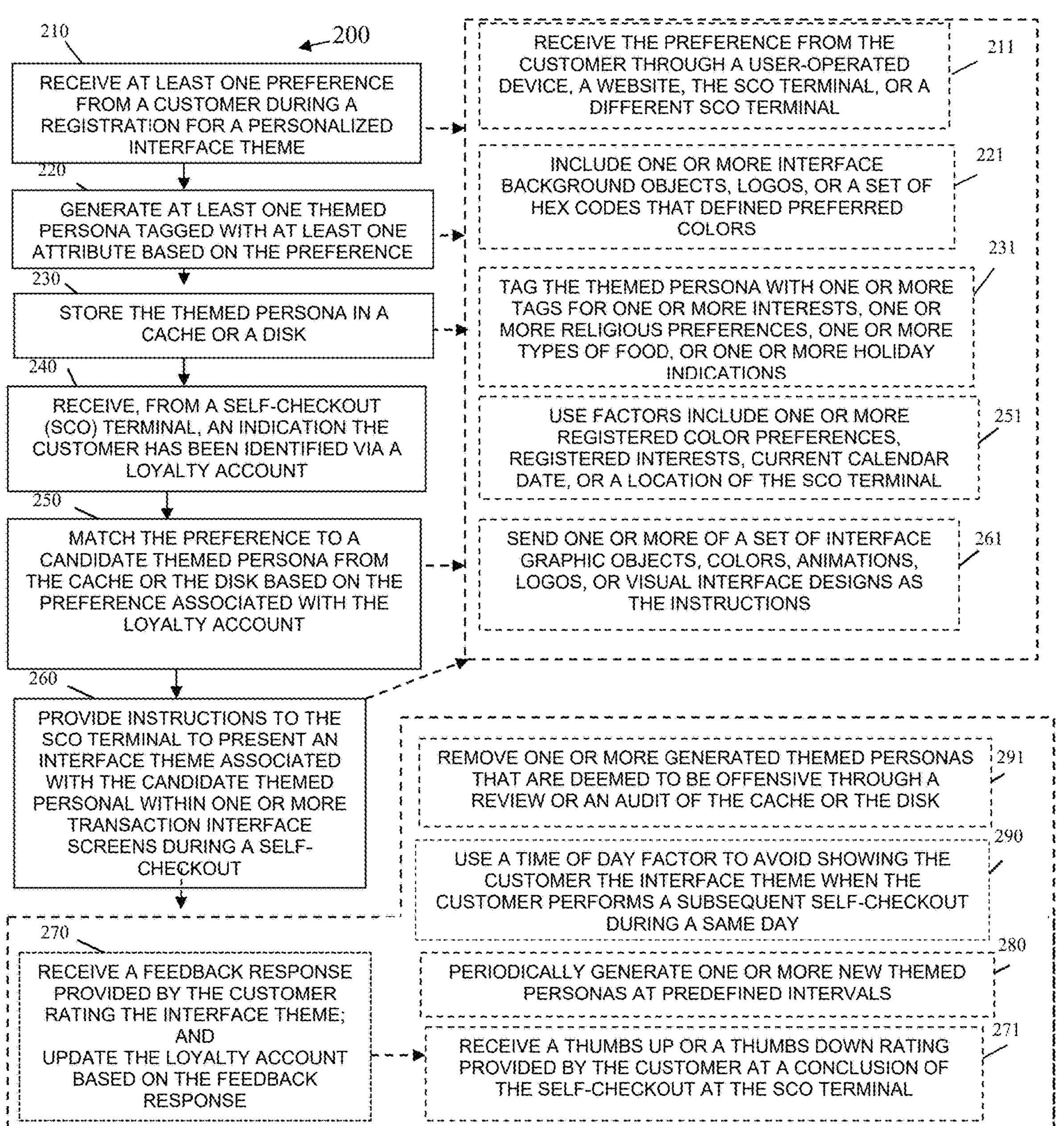
FIG. 2 is a flow diagram of a method for personalizing a self-checkout's user interface with a personalized themed interface, according to an example embodiment.
Figure 3:
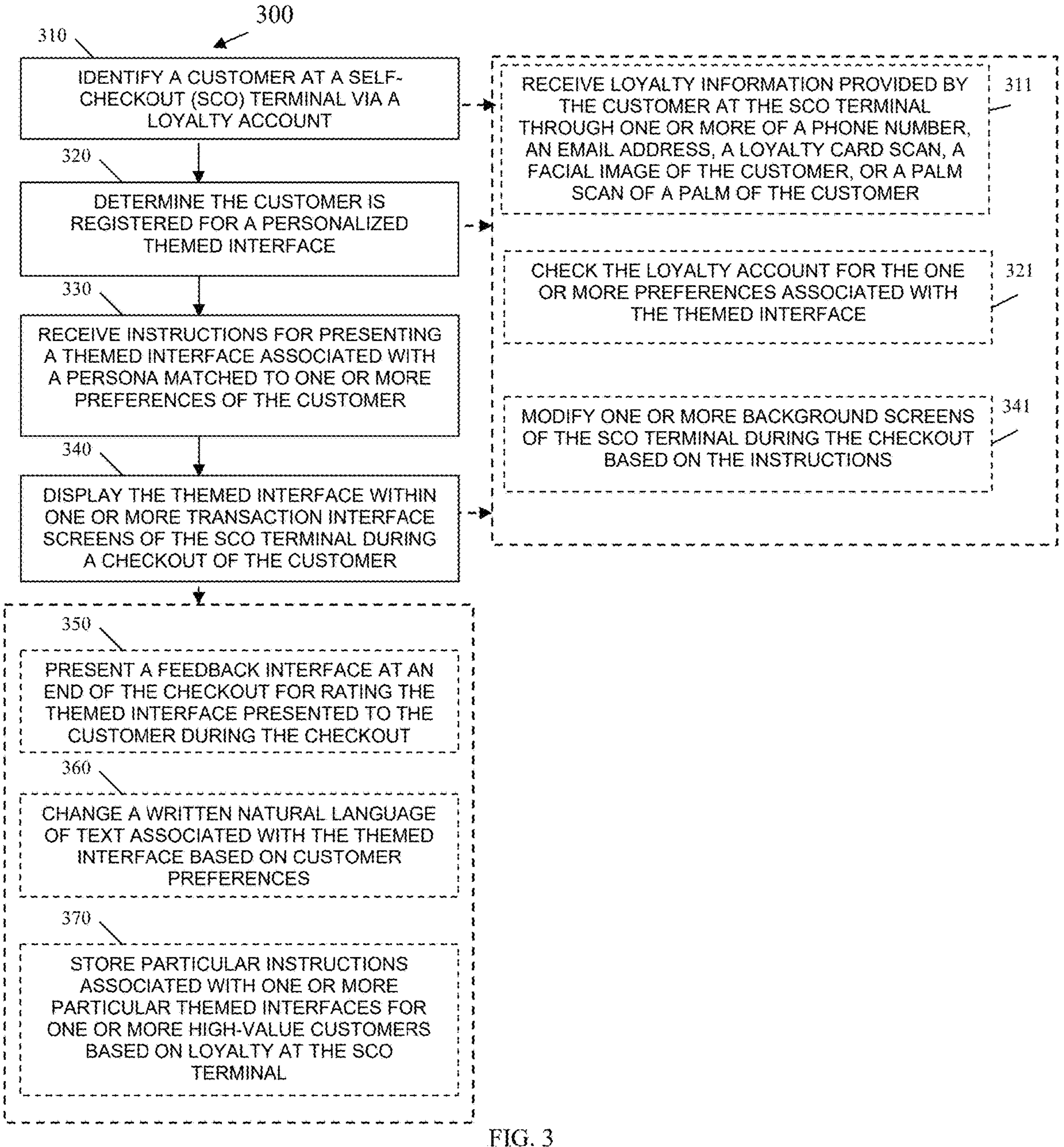
FIG. 3 is a flow diagram of another method for personalizing a self-checkout's UI with a personalized themed interface, according to an example embodiment.

The above-referenced embodiments and other embodiments are now discussed within FIGS. 2-3. FIG. 2 is a flow diagram of a method 200 for personalizing a self-checkout's UI with a personalized themed interface, according to an example embodiment. The software module(s) that implements the method 200 is referred to as a "cloud-based self-checkout personalized themed UI service." The cloud-based self-checkout personalized themed UI service is implemented as executable instructions programmed and residing within memory and/or a non-transitory computer-readable (processor-readable) storage medium and executed by one or more processors of one or more devices. The processor(s) of the device that executes the cloud-based self-checkout personalized themed UI service are specifically configured and programmed to process the cloud-based self-checkout personalized themed UI service. The cloud-based self-checkout personalized themed UI service may have access to one or more network connections during its processing. The network connections can be wired, wireless, or a combination of wired and wireless.

In an embodiment, the device that executes the cloud-based self-checkout personalized themed UI service is cloud 110. In an embodiment, the device that execute the cloud-based self-checkout personalized themed UI service is retailer server 120. In an embodiment, the cloud-based self-checkout personalized themed UI service is all or some combination of themed interface registration manager 113 and themed interface manager 114.

At 210, the cloud-based self-checkout personalized themed UI service receives at least one preference from a customer during a registration for a personalized interface theme. The interface theme is subsequently rendered within transaction interface screens of a SCO terminal 130 during a self-checkout by a customer. The interface theme is not static and changes from transaction to transaction by the customer based on the persona matched to the preferences of the customer. In an embodiment, at 211, the cloud-based self-checkout personalized themed UI service receives the preference from the customer through a user-operated device 140, a website via a web browser, the SCO terminal 130 or a different SCO terminal.

At 220, the cloud-based self-checkout personalized themed UI service generate at least one themed persona tagged with at least one attribute based on the preference. In an embodiment, at 221, the cloud-based self-checkout personalized themed UI service include one or more interface background objects, logos, or a set of hex codes that defined the customer's preferred colors or color schemes.

At 230, the cloud-based self-checkout personalized themed UI service stores the themed person in a cache or a disk 115. In an embodiment, at 231, the cloud-based self-checkout personalized themed UI service tags the themed persona with one or more tags for one or more interests, one or more religious preferences, one or more types of food, or one or more holiday indications.

At 240, the cloud-based self-checkout personalized themed UI service receives from an SCO terminal 130 an indication that the customer has been identified via a loyalty account. Identification at the SCO terminal 130 can include entry of information by the customer to identify the loyalty account, a facial scan of the customer's face, or a palm of the customer read by a palm reader of the SCO terminal 130.

At 250, the cloud-based self-checkout personalized themed UI service matches the preferences to a candidate themed persona from the cache or the disk 115 based on the preferences associated with the loyalty account of the customer. In an embodiment, at 251, the cloud-based self-checkout personalized themed UI service uses factors, which include one or more of registered color preferences, registered interests, current calendar date, or a location of the SCO terminal 130.

At 260, the cloud-based self-checkout personalized themed UI service provides instructions to the SCO terminal 130 to present an interface theme associated with the candidate themed persona within one or more transaction interface screens during the self-checkout. In an embodiment, at 261, the cloud-based self-checkout personalized themed UI service sends one or more of a set of interface graphical objects, animations, logos, or visual interface designs as the instructions.

In an embodiment, at 270, the cloud-based self-checkout personalized themed UI service receives a feedback response provided by the customer who rates the interface theme. The cloud-based self-checkout personalized themed UI service updates the loyalty account of the customer based on the feedback response. In an embodiment, at 271, the cloud-based self-checkout personalized themed UI service receives a thumbs up or a thumbs down rating provided by the customer at a conclusion of the self-checkout at the SCO terminal 130.

In an embodiment, at 280, the cloud-based self-checkout personalized themed UI service periodically generates one or more new themed personas at predefined intervals of time. In an embodiment, at 290, the cloud-based self-checkout personalized themed UI service uses a time of day factor to avoid showing the customer the interface theme when the customer performs a subsequent self-checkout during a same day. In an embodiment, at 291, the cloud-based self-checkout personalized themed UI service removes one or more generated themed personas that are deemed to be offensive through a review or an audit of the cache or the disk 115.

FIG. 3 is a diagram of another method 300 for personalizing a self-checkout's UI with a personalized themed interface, according to an example embodiment. The software module(s) that implements the method 300 is referred to as a "self-checkout personalized themed transaction interface manager." The self-checkout personalized themed transaction interface manager is implemented as executable instructions programmed and residing within memory and/or a non-transitory computer-readable (processor-readable) storage medium and executed by one or more processors of a device. The processors that execute the self-checkout personalized themed transaction interface manager are specifically configured and programmed for processing the self-checkout personalized themed transaction interface manager. The self-checkout personalized themed transaction interface manager may have access to one or more network connections during its processing. The network connections can be wired, wireless, or a combination of wired and wireless.

In an embodiment, the device that executes the self-checkout personalized themed transaction interface manager is terminal 130. In an embodiment, self-checkout personalized themed transaction interface manager is all or some combination of transaction manager 133 and UI agent 134. The self-checkout personalized themed transaction interface manager interacts with method 200 of FIG. 2. The self-checkout personalized themed transaction interface manager also interacts with transaction system 123 and/or loyalty system 124 of retailer server 120.

At 310, the self-checkout personalized themed transaction interface manager identifies a customer at an SCO terminal 130 via a loyalty account of the customer. In an embodiment, at 311, the self-checkout personalized themed transaction interface manager receives loyalty information provided by the customer at the SCO terminal 130 through one or more of a phone number, an email address, a loyalty card scan, a facial image of the customer, or a palm scan of a palm of the customer.

At 320, the self-checkout personalized themed transaction interface manager determines the customer is registered for a personalized themed interface. In an embodiment, at 321, the self-checkout personalized themed transaction interface manager checks the loyalty account for the one or more preferences associated with the themed interface to determine that the customer is registered.

At 330, the self-checkout personalized themed transaction interface manager receives instructions for presenting a themed interface associated with a persona matched to the one or more of the preferences of the customer. At 340, the self-checkout personalized themed transaction interface manager displays the themed interface within one or more transaction interface screens of the SCO terminal 130 during a checkout of the customer at the SCO terminal 130. In an embodiment, at 341, the self-checkout personalized themed transaction interface manager modifies one or more background screens of the SCO terminal 130 during the checkout based on the instructions.

In an embodiment, at 350, the self-checkout personalized themed transaction interface manager presents a feedback interface at an end of the checkout for rating the themed interface presented to the customer during the checkout. In an embodiment, at 360, the self-checkout personalized themed transaction interface manager changes a written natural language of text associated with the themed interface based on customer preferences. In an embodiment, at 370, the self-checkout personalized themed transaction interface manager stores particular instructions associated with one or more particular themed interfaces for one or more high-value customers based on loyalty at the SCO terminal 130. In this embodiment, the self-checkout personalized themed transaction interface manager can obtain a high-value customer's themed interface instructions directly from cache or disk associated with the SCO terminal 130 without interacting with a server to obtain the customer's themed interface, which means the response time to implement the themed interface is nearly instantaneous.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving, at a server, at least one preference from a customer during a registration for a personalized interface theme;

generating, by the server, at least one themed persona tagged with at least one attribute based on the at least one preference by processing an artificial intelligence (AI) algorithm that is trained to receive the at least one preference as an AI prompt and to generate the at least one themed persona;

storing the at least one themed persona in a cache or a disk;

receiving, from a self-checkout (SCO) terminal, an indication that the customer has been identified via a loyalty account;

matching, by the server, the at least one preference to a candidate themed persona from the cache or the disk based on the at least one preference associated with the loyalty account;

providing instructions to the SCO terminal to present an interface theme associated with the candidate themed persona within one or more transaction interface screens during a self-checkout;

presenting a feedback interface to the customer, the feedback interface includes a visual depiction of a thumb up and thumb down for the interface theme;

receiving, from the feedback interface, a selection of the thumb up or thumb down as a customer feedback; and updating the generating based on the customer feedback for a subsequent self-checkout of the customer.

2. The method of claim 1, wherein receiving the at least one preference comprises receiving the at least one preference from the customer through a user-operated device, a website, the SCO terminal, or a different SCO terminal.

3. The method of claim 1, wherein generating comprises including one or more interface background objects, logos, or a set of hex codes that define preferred colors.

4. The method of claim 1, wherein storing comprises tagging the at least one themed persona with one or more tags for one or more interests, one or more religious preferences, one or more types of food, or one or more holiday indications.

5. The method of claim 1, wherein matching comprises using factors including one or more of registered color preferences, registered interests, current calendar date, or a location associated with the SCO terminal.

6. The method of claim 1, wherein providing comprises sending one or more of a set of user interface graphic objects, colors, animations, logos, or visual interface designs.

7. The method of claim 1, further comprising:

updating the loyalty account based on the customer feedback response.

8. The method of claim 1, further comprising:

periodically generating one or more new themed personas at predefined intervals.

9. The method of claim 1, further comprising:

using a time of day factor to avoid showing the customer the interface theme when the customer performs a subsequent self-checkout during a same day.

10. The method of claim 1, further comprising:

removing one or more generated themed personas that are deemed to be offensive through a review or an audit of the cache or the disk.

11. A method, comprising:

identifying a customer at a self-checkout (SCO) terminal via a loyalty account;

determining the customer is registered for a personalized themed interface;

receiving, from a server, instructions for presenting a themed interface associated with a persona matched to one or more preferences of the customer, wherein receiving further includes generating by an artificial intelligence (AI) algorithm that is trained to receive the one or more preferences as an AI prompt and to generate the themed interface associated with the loyalty account of the customer;

displaying the themed interface within one or more transaction interface screens of the SCO terminal during a checkout of the customer;

presenting a feedback interface to the customer, the feedback interface includes a visual depiction of a thumb up and thumb down for the themed interface;

receiving, from the feedback interface, a selection of the thumb up or thumb down as a customer feedback; and updating the generating based on the customer feedback for a subsequent self-checkout of the customer.

12. The method of claim 11, wherein identifying comprises receiving loyalty information provided by the customer at the SCO terminal through one or more of a phone number, an email address, a loyalty card scan, a facial image of the customer, or a palm scan of a palm of the customer.

13. The method of claim 11, wherein determining comprises checking the loyalty account for the one or more preferences associated with the themed interface.

14. The method of claim 11, wherein displaying comprises modifying one or more background screens of the SCO terminal during the checkout based on the instructions.

15. The method of claim 11, further comprising:

changing a written natural language of text associated with the themed interface based on customer preferences.

16. The method of claim 11, further comprising:

storing particular instructions associated with one or more particular themed interfaces for one or more pre-designated high-valued customers based on loyalty at the SCO terminal.

17. A system, comprising:

a server comprising:

a processor; and a memory storing instructions that when executed cause the processor to:

store at least one preference of a customer received during registration;

generate one or more themed personas tagged with one or more attributes based on the at least one preference by processing an artificial intelligence (AI) algorithm that is trained to receive the at least one preference as an AI prompt and to generate the one or more themed personas;

cache or store on disk the one or more themed personas;

match the at least one preference to a particular persona from the one or more themed personas;

provide theme instructions to a self-checkout (SCO) terminal;

receive a customer feedback at the SCO terminal; and updating generation of the one or more themed personas based on the customer feedback for a subsequent self-checkout of the customer;

the SCO terminal comprising:

a display;

a processor; and a memory storing instructions that when executed cause the processor to:

identify the customer via a loyalty account;

request a personalized theme from the server;

receive the theme instructions; and present a themed interface within transaction interface screens on the display during a checkout of the customer at the SCO terminal;

present a feedback interface to the customer, the feedback interface includes a visual depiction of a thumb up and thumb down for the themed interface;

receive, from the feedback interface, a selection of the thumb up or thumb down as the customer feedback; and providing the customer feedback to the server.

18. The system of claim 17, wherein the instructions of the server further cause the processor of the server to:

update the loyalty account based on the customer themed feedback response.

* * * * *